(12) United States Patent
Friesen et al.

(10) Patent No.: US 11,003,870 B2
(45) Date of Patent: May 11, 2021

(54) REDOX ACTIVE POLYMER DEVICES AND METHODS OF USING AND MANUFACTURING THE SAME

(71) Applicant: Arizona Board of Regents on behalf of Arizona State University, Scottsdale, AZ (US)

(72) Inventors: Cody Friesen, Fort McDowell, AZ (US); Elise Switzer, Napa, CA (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 14/442,087

(22) PCT Filed: Jan. 9, 2015

(86) PCT No.: PCT/US2015/010863
§ 371 (c)(1),
(2) Date: May 11, 2015

(87) PCT Pub. No.: WO2015/106132
PCT Pub. Date: Jul. 16, 2015

(65) Prior Publication Data
US 2016/0350565 A1    Dec. 1, 2016

Related U.S. Application Data

(60) Provisional application No. 61/926,200, filed on Jan. 10, 2014.

(51) Int. Cl.
*G06K 7/10* (2006.01)
*H01M 4/60* (2006.01)
(Continued)

(52) U.S. Cl.
CPC ..... *G06K 7/10366* (2013.01); *G06K 7/10158* (2013.01); *H01M 4/604* (2013.01);
(Continued)

(58) Field of Classification Search
CPC .......... G06K 7/10366; G06K 7/10158; H01M 4/604; H01M 4/606; H01M 6/40;
(Continued)

(56) References Cited

U.S. PATENT DOCUMENTS 4,265,789 A    5/1981   Christopherson et al.
4,375,427 A    3/1983   Miller et al.
(Continued)

FOREIGN PATENT DOCUMENTS

EP    0 717 418    6/1996
JP    2005-510886  4/2005
(Continued)

OTHER PUBLICATIONS

U.S. Appl. No. 11/763,658, filed Jun. 15, 2007, Hossan et al.
(Continued)

*Primary Examiner* — Patrick N Edouard
*Assistant Examiner* — Eboni N Giles
(74) *Attorney, Agent, or Firm* — Withrow & Terranova, P.L.L.C.

(57) ABSTRACT

The disclosed technology relates generally to apparatuses comprising conductive polymers and more particularly to tags and tag devices comprising a redox-active polymer film, and methods of using and manufacturing the same. In one aspect, an apparatus includes a substrate and a conductive structure formed on the substrate which includes a layer of redox-active polymer film having mobile ions and electrons. The conductive structure further includes a first terminal and a second terminal configured to receive an electrical signal therebetween, where the layer of redox-active (Continued)

polymer is configured to conduct an electrical current generated by the mobile ions and the electrons in response to the electrical signal. The apparatus additionally includes a detection circuit operatively coupled to the conductive structure and configured to detect the electrical current flowing through the conductive structure.

37 Claims, 5 Drawing Sheets (51) Int. Cl.
| | |
|---|---|
| H01M 10/0565 | (2010.01) |
| H01M 10/0585 | (2010.01) |
| H01M 10/42 | (2006.01) |
| H01M 6/40 | (2006.01) |
| H01M 10/04 | (2006.01) |
| H01M 10/05 | (2010.01) |
| H01M 10/46 | (2006.01) |

(52) U.S. Cl.
CPC ............ *H01M 4/606* (2013.01); *H01M 6/40* (2013.01); *H01M 10/0436* (2013.01); *H01M 10/05* (2013.01); *H01M 10/0565* (2013.01); *H01M 10/0585* (2013.01); *H01M 10/425* (2013.01); *H01M 10/46* (2013.01); *H01M 2220/30* (2013.01); *H01M 2300/0085* (2013.01)

(58) Field of Classification Search
CPC ............ H01M 10/0436; H01M 10/05; H01M 10/0565; H01M 10/0585; H01M 10/425; H01M 10/46; H01M 2220/30; H01M 2300/0085
See application file for complete search history.

(56) References Cited

U.S. PATENT DOCUMENTS

| | | |
|---|---|---|
| 4,535,039 A | 8/1985 | Naarmann et al. |
| 4,869,979 A | 9/1989 | Ohtani et al. |
| 5,512,391 A | 4/1996 | Fleischer |
| 5,569,708 A | 10/1996 | Wudl et al. |
| 5,637,421 A | 6/1997 | Poehler et al. |
| 5,700,398 A | 12/1997 | Angelopoulos et al. |
| 5,731,105 A | 3/1998 | Fleischer et al. |
| 5,776,587 A | 7/1998 | Angelopoulos et al. |
| 5,840,443 A | 11/1998 | Gregg et al. |
| 5,891,968 A | 4/1999 | Wudl et al. |
| 5,916,486 A | 6/1999 | Angelopoulos et al. |
| 5,922,466 A | 7/1999 | Angelopoulos et al. |
| 5,938,979 A | 8/1999 | Kambe et al. |
| 5,973,598 A | 10/1999 | Beigel |
| 5,985,458 A | 11/1999 | Angelopoulos et al. |
| 5,997,773 A | 12/1999 | Angelopoulos et al. |
| 6,045,952 A | 4/2000 | Kerr et al. |
| 6,300,015 B1 | 10/2001 | Nishiyama et al. |
| 6,700,491 B2 | 3/2004 | Shafer |
| 6,762,683 B1 | 7/2004 | Giesler |
| 6,776,929 B2 | 8/2004 | Hossan et al. |
| 6,899,974 B2 | 5/2005 | Kamisuki et al. |
| 6,944,424 B2 | 9/2005 | Heinrich et al. |
| 7,482,620 B2 | 1/2009 | Kugler et al. |
| 7,675,123 B2 | 3/2010 | Leenders et al. |
| 7,722,920 B2 | 5/2010 | Mickle et al. |
| 7,911,345 B2 | 3/2011 | Potyrailo et al. |
| 8,168,337 B2 | 5/2012 | Friesen et al. |
| 8,260,203 B2 | 9/2012 | Brantner |
| 8,309,259 B2 | 11/2012 | Friesen et al. |
| 8,445,133 B2 | 5/2013 | Friesen et al. |
| 8,481,207 B2 | 7/2013 | Friesen et al. |
| 8,546,028 B2 | 10/2013 | Friesen et al. |
| 8,895,197 B2 | 11/2014 | Friesen et al. |
| 9,184,478 B2 | 11/2015 | Friesen et al. |
| 9,236,643 B2 | 1/2016 | Friesen et al. |
| 9,780,394 B2 | 10/2017 | Friesen et al. |
| 9,882,215 B2 | 1/2018 | Johnson et al. |
| 9,990,578 B2 | 6/2018 | Johnson et al. |
| 10,090,520 B2 | 10/2018 | Friesen et al. |
| 10,256,460 B2 | 4/2019 | Friesen et al. |
| 10,374,236 B2 | 8/2019 | Friesen et al. |
| 10,482,367 B2 | 11/2019 | Johnson et al. |
| 2003/0230746 A1 | 12/2003 | Stasiak |
| 2004/0214078 A1 | 10/2004 | Mitani et al. |
| 2004/0256644 A1 | 12/2004 | Kugler et al. |
| 2006/0102869 A1 | 5/2006 | Cavaille et al. |
| 2006/0263697 A1 | 11/2006 | Dahn et al. |
| 2007/0059901 A1 | 3/2007 | Majumdar et al. |
| 2007/0176773 A1 | 8/2007 | Smolander et al. |
| 2007/0238014 A1 | 10/2007 | Koshina et al. |
| 2008/0286907 A1* | 11/2008 | Li ................... H01L 21/02628 438/141 |
| 2008/0303637 A1 | 12/2008 | Gelbman et al. |
| 2009/0017342 A1 | 1/2009 | Friesen et al. |
| 2009/0090907 A1 | 4/2009 | Kugler et al. |
| 2009/0117574 A1 | 5/2009 | Labgold et al. |
| 2009/0176162 A1* | 7/2009 | Exnar ............... H01M 10/0567 429/336 |
| 2010/0273063 A1 | 10/2010 | Wallace et al. |
| 2011/0096388 A1* | 4/2011 | Agrawal ................. G02F 1/155 359/268 |
| 2011/0221385 A1* | 9/2011 | Partovi ................. H02J 50/005 320/101 |
| 2011/0300808 A1* | 12/2011 | Rokhsaz ................... H03H 7/40 455/67.11 |
| 2012/0077084 A1 | 3/2012 | Christensen et al. |
| 2012/0138357 A1 | 6/2012 | Lim et al. |
| 2012/0206239 A1* | 8/2012 | Ikemoto ............... H04B 5/0062 340/10.1 |
| 2013/0230771 A1 | 9/2013 | Deronzier et al. |
| 2014/0038036 A1 | 2/2014 | Nishide et al. |
| 2015/0310771 A1* | 10/2015 | Atkinson ........... G06K 19/0701 40/5 |
| 2015/0333331 A1 | 11/2015 | Johnson et al. |
| 2016/0028070 A1 | 1/2016 | Friesen et al. |
| 2016/0301077 A1 | 10/2016 | Huang et al. |
| 2018/0260673 A1 | 9/2018 | Johnson et al. |
| 2019/0036115 A1 | 1/2019 | Friesen et al. |
| 2019/0123340 A1 | 4/2019 | Friesen et al. |
| 2019/0205717 A1 | 7/2019 | Johnson et al. |
| 2019/0276662 A1 | 9/2019 | Friesen et al. |
| 2019/0355996 A1 | 11/2019 | Friesen et al. |

FOREIGN PATENT DOCUMENTS

| | | |
|---|---|---|
| TW | I484683 B | 5/2015 |
| TW | 201829530 A | 8/2018 |
| WO | WO 1997/030445 | 8/1997 |
| WO | 2008080075 A1 | 7/2008 |
| WO | 2009124249 A1 | 10/2009 |
| WO | 2009142848 A2 | 11/2009 |
| WO | 2010132357 A1 | 11/2010 |
| WO | 2011143368 A1 | 11/2011 |
| WO | 2013106122 A2 | 7/2013 |
| WO | 2013132106 A1 | 9/2013 |
| WO | 2014164150 A1 | 10/2014 |
| WO | 2015106132 A1 | 7/2015 |
| WO | 2015175553 A1 | 11/2015 |
| WO | 2015175556 A1 | 11/2015 |
| WO | 2018081165 A1 | 5/2018 |

OTHER PUBLICATIONS

U.S. Appl. No. 12/306,156, filed Dec. 22, 2008, Murray.
U.S. Appl. No. 13/266,303, filed Nov. 22, 2011, Fontecchio et al.
Takashima, Electroplasticity memory devices using conducting polymers and solid polymer electrolytes. Polymer International, vol. 27 Iss, 3, pp. 249-253, 1992.
J.C. Chin, International Search Report for PCT/US2014/020874, dated Jul. 1, 2014.

(56) References Cited

OTHER PUBLICATIONS

S.C. Kang, International Search Report and Written Opinion for PCT/US2015/010863, dated Apr. 22, 2014.
D.S. Kim, Written Opinion of the International Searching Authority for PCT/US2015/030409, dated Aug. 17, 2015.
D.S. Kim, Written Opinion of the International Searching Authority for PCT/US2015/030412, dated Aug. 17, 2015, Oct. 6, 2015.
Chae, I. S. et al. Redox equilibrium of a zwitterionic radical polymer in a non-aqueous electrolyte as a novel Li+ host material in a Li-ion battery. Journal of Materials Chemistry A, vol. 1, pp. 9608-9611. (2013).
Golriz, A. A. et al. Redox active polymer brushes with phenothiazine moieties. ACS Applied Materials & Interfaces. vol. 5, pp. 2485-2494 (2013).
Laschewsky, A. Structures and Syntheis of Zwitterionic Polymers, 6, pp. 1544-1601 (2014).
Li, Z. H. et al., Effect of zwitterionic salt on the electrochemical properties of a solid polymer electrolyte with high temperature stability for lithium ion batteries, Electrochimica Acta 56, pp. 804-809 (2010).
Chae, I. S. Synthesis of Zwitterionic Redox-Active Radical Polymers and Their Application to an Organic Secondary Battery, PhD thesis, Waseda University, Feb. 2013.
Cardos, J. et al., Synthesis and Characterization of Zwitterionic Polymers with a Flexible Lateral Chain, J. Phys. Chem. C, 114, pp. 14261-14268 (2010).
International Preliminary Report on Patentability dated Jul. 12, 2016 in PCT Application No. PCT/US2015/010863.
International Search Report and Written Opinion dated Apr. 22, 2015 in PCT Application No. PCT/US2015/010863.
Ferrer-Vidal, Antonio, et al., "Integration of Sensors and RFID's on Ultra-ow-cost Paper-based Substrates for Wireless Sensor Networks Applications," IEEE Workshop on Wireless Mesh Networks, 2006, IEEE, pp. 126-128.
Potyrailo, Radislav, et al., "Battery-free radio frequency identification (RFID) sensors for food quality and safety," Journal of Agricultural and Food Chemistry, vol. 60, Issue 35, Sep. 5, 2013, 22 pages.
Song, Hyun-Kon, et al., "Redox-Active Polypyrrole: Toward Polymer-Based Batteries," Advanced Materials, vol. 18, Issue 13, 2006, pp. 1764-1768.
Song, Zhiping, et al., "Towards sustainable and versatile energy storage devices: an overview of organic electrode materials," Energy and Environmental Science, vol. 6, 2013, RSC Publishing, pp. 2280-2301.
International Preliminary Report on Patentability for PCT/US2015/030412, dated Nov. 24, 2016, 7 pages.
International Preliminary Report on Patentability for PCT/US2015/030409, dated Nov. 24, 2016, 9 pages.
International Preliminary Report on Patentability for PCT/US2014/020874, dated Sep. 24, 2015, 8 pages.
Non-Final Office Action for U.S. Appl. No. 14/774,636, dated Oct. 20, 2017, 7 pages.
Final Office Action for U.S. Appl. No. 14/774,636, dated May 23, 2018, 5 pages.
Non-Final Office Action for U.S. Appl. No. 15/973,396, dated Jun. 28, 2018, 10 pages.
Non-Final Office Action for U.S. Appl. No. 14/710,509, dated Jun. 1, 2017, 7 pages.
Notice of Allowance for U.S. Appl. No. 14/710,509, dated Sep. 22, 2017, 7 pages.
Notice of Allowance for U.S. Appl. No. 14/710,367, dated Feb. 8, 2018, 8 pages.
Non-Final Office Action for U.S. Appl. No. 14/710,367, dated Sep. 22, 2017, 30 pages.
Non-Final Office Action for U.S. Appl. No. 14/710,367, dated Mar. 24, 2017, 19 pages.
U.S. Appl. No. 16/455,185.
Non-Final Office Action for U.S. Appl. No. 16/299,884, dated Jun. 28, 2019, 14 pages.
Notice of Allowance and Examiner-Initiated Interview Sumary for U.S. Appl. No. 16/299,884, dated Aug. 23, 2019, 9 pages.
Final Office Action for U.S. Appl. No. 16/211,740, dated Jul. 15, 2020, 9 pages.
Non-Final Office Action for U.S. Appl. No. 16/687,875, dated Jul. 10, 2020, 8 pages.
U.S. Appl. No. 16/687,875, filed Nov. 19, 2019, Johnson et al.
Notice of Allowance for U.S. Appl. No. 16/687,875, dated Oct. 1, 2020, 8 pages.
Non-Final Office Action for U.S. Appl. No. 16/211,740, dated Mar. 30, 2020, 9 pages.

* cited by examiner

REDOX ACTIVE POLYMER DEVICES AND METHODS OF USING AND MANUFACTURING THE SAME

CROSS-REFERENCE TO RELATED APPLICATION

This application is a national phase application of PCT Application PCT/US2015/010863, filed Jan. 9, 2015, which claims the benefit of U.S. Provisional Application No. 61/926,200, filed Jan. 10, 2014, the contents of each of which are hereby incorporated by reference in their entireties.

STATEMENT REGARDING FEDERALLY SPONSORED R&D

This invention was made with government support under DE-AR0000459 awarded by the Department of Energy. The government has certain rights in the invention.

BACKGROUND OF THE INVENTION

Field of the Invention

The disclosed technology relates generally to devices comprising conductive polymers and more particularly to tag devices comprising a redox-active polymer film, and method of using and manufacturing the same.

Description of the Related Art

Conductive structures made from conductive polymer films are used in a wide variety of applications and often offer advantages over their metallic counterparts. For example, conductive structures made from conductive polymers can offer advantages in cost, flexibility, weight, form factor and ease of manufacturing, to name a few. For example, conductive structures made from conductive polymer films can be used for connecting, fastening and electromagnetic shielding, to name a few applications. Some conductive polymers comprise conjugated double bonds which provide the electronic conduction. Redox-active polymers are conducting polymers comprising functional groups capable of reversibly transitioning between at least two oxidation states wherein the transition between states occurs through oxidation (i.e. electron loss) and reduction (i.e. electron gain) processes. In addition to redox activity provided by the redox center, some redox-active polymers, e.g., polyaniline, may conduct electricity through the polymer chains.

SUMMARY OF THE INVENTION

The disclosed technology relates generally to devices comprising conductive polymers and more particularly to tag devices comprising a redox-active polymer film, and method of using and manufacturing the same.

In one aspect, a tag apparatus comprises a substrate and a conductive structure formed on the substrate. The conductive structure includes a layer of redox-active polymer film having mobile ions and mobile electrons. The conductive structure further includes a first terminal and a second terminal configured to receive an electrical signal therebetween, where the layer of redox-active polymer is configured to conduct an electrical current generated by the mobile ions and electrons in response to the electrical signal. The apparatus additionally comprises a detection circuit operatively coupled to the conductive structure and configured to detect the electrical current flowing through the conductive structure.

In another aspect, an active tag apparatus comprises an electrochemical energy storage device. The electrochemical storage device comprises a first electrode layer comprising a first redox-active polymer having mobile ions and mobile electrons and a second electrode layer comprising a second redox-active polymer film having mobile ions and mobile electrons. The first electrode has a first redox potential and the second electrode has a second redox potential higher than the first redox potential. The electrochemical energy storage device additionally comprises an electrolyte layer interposed between the first electrode layer and the second electrode layer. The electrolyte layer includes a conductive polymer film configured to conduct ionic current by passing mobile ions therethrough between the first and second electrode layers, and the conductive polymer film is further configured to not conduct a substantial amount of electronic current. The active tag apparatus additionally comprises a load device operatively coupled to the storage device. Under a charge condition, the storage device is configured to be charged via an ionic current flowing through the electrolyte layer between the first electrode layer which is configured to be reduced and second electrode layer which is configured to be oxidized. Under a discharge condition, the first electrode layer is configured to be oxidized and the second electrode is configured to be reduced such that an electronic current flows through the load device.

In another aspect, an active tag device comprises a conductive structure having a first terminal and a second terminal and configured to receive an electromagnetic signal therebetween, the conductive structure comprising a redox-active polymer film having mobile ions and mobile electrons and configured to conduct an electrical current generated by the mobile ions and the mobile electrons in response to the electromagnetic signal. The active tag device additionally comprises a conversion circuit configured to convert the electromagnetic signal into a DC voltage. The active device further comprises a storage device having a first electrode layer and a second electrode layer configured to receive the DC voltage, the storage device further comprising an electrolyte layer interposed between the first electrode layer and the second electrode layer. The electrolyte layer comprises a conductive polymer film configured to pass mobile ions, and the storage device is configured to be charged in response to the DC voltage developed by mobile ions passing between the first and second electrode layers in response to the DC voltage.

These and other embodiments are described in greater detail below.

BRIEF DESCRIPTION OF THE DRAWINGS

Claimed subject matter is particularly pointed out in the concluding portion of the specification. However, organization and/or method of operation, together with certain objects, features, and/or advantages thereof, may be better understood by reference to the following detailed description if read with the accompanying drawings in which:

DETAILED DESCRIPTION OF THE PREFERRED EMBODIMENTS

Some electrically conductive polymers are organic polymers that comprise conjugated double bonds that provide electronic conduction properties (e.g. polyacetylene). Redox-active polymers are polymers comprising functional groups, also referred to as redox centers, that are capable of reversibly transitioning between at least two oxidation states wherein the transition between states occurs through oxidation (i.e. electron loss) and reduction (i.e. electron gain) processes. In addition to the redox activity provided by the redox center, redox-active polymers may be electrically conductive through the polymer chain (e.g. polyaniline). For the purposes of the following description, the term "redox-active polymer" may be used interchangeably with the term "redox polymer" to describe conductive redox-active polymers.

Conductive structures made from conductive polymer films are used in a wide variety of applications and often offer advantages over their metallic counterparts, including lower cost, flexibility, lower weight, lower form factor and ease of manufacturing. Examples of such application can include electronic components such as an antenna, a resistor, an inductor, a capacitor, a diode, a light-emitting element and a transistor, to name a few. Other example applications include conductive tags, tag devices and adhesive members. Conventionally, such devices can be made from thin metallic materials, or from nonconductive medium such as polymeric sheets having metallic or other conductive elements in the form of a metallic paint, metallic tape or metallic or carbon fiber, nanotube and/or particle forming a conductive network therein and/or thereon. The nonconductive medium which includes the metallic or other conductive elements can be, for example, a polymer layer and/or matrix e.g. epoxy, vinylester, polyester, thermoplastic and/or phenol formaldehyde resin, to name a few.

One particular application of conductive polymers can include a tag device. As used herein, a tag broadly refers to any conductive structure that may be affixed to a parent structure for the purpose of providing, for example some information about the parent structure. A tag can be, for example, an adhesive, a label, a sticker, an identification tag or a radio frequency identification (RFID) tag, to name a few examples. The information can be any information, such as a product information (e.g. location, age, etc.) and environmental information (temperature, humidity, etc.), among other types of information.

The tag may be adhered to a parent object or structure via an adhesive, printing, electrodeposition or other adhering process. The location, identification and flow of assets (e.g. consumer products, merchandise, inventory, goods, animals, etc.) are often monitored by affixing a tag to the parent object. Radio-frequency identification (RFID) tags are often affixed to a parent object for monitoring its related information which may be stored in a memory component (e.g. microchip) of the RFID tag. A suitable electromagnetic field may be employed to read and/or change information related to the parent object. An RFID tag can be passive or active. As used herein, passive RFID tags refer to RFID tags that do not have long term energy storage capability, and are therefore typically limited by the strength and radius of the interrogative electromagnetic field. As a result, passive RFID tags are often limited to short communication ranges and data tracking time periods. On the other hand, as used herein, active RFID tags refer to RFID tags that have long term energy storage capability, and therefore are less limited in spatial and time ranges compared to passive RFID tags. However, active RFID tags can be more expensive, more complex and/or larger in size compared to passive RFID.

Labels, stickers, RFID tags and other adhesive products are used for communicating information either in writing or electromagnetically. These systems are also often used as the primary or secondary fastening systems in consumer and automotive electronics and various types of enclosures. For example, identification tags may be affixed to a product for the purpose of inventory control. Conventional active and semi-passive tags are prohibitively expensive for low-cost applications and products. Currently, active and semi-passive tags are too expensive for low-cost item inventory control due to the cost of the energy storage component. Conventional active tags typically comprise a battery which powers microchip circuitry. Additionally, active tags may employ batteries to power an antenna for signal broadcast. Semi-passive tags typically comprise a battery to power microchip circuitry, however interrogative electromagnetic waves induce an antenna current for signal broadcast.

Conventional low-cost passive tags do not comprise a battery or energy storage means. Passive tags operate via a backscatter mechanism wherein an incoming interrogative waveform is modulated by the tag and reflected back to a reader. There are several drawbacks of conventional low-cost passive tags including restricted signal ranges, limited "active" time periods and low signal-to-noise ratios due to the absence of an energy storage component.

Thus, there is a need for tag devices and other similar devices made from conductive polymers which can offer existing benefits of tags made from traditional materials, while capable of being integrated with low cost energy storage devices such as thin film batteries. According to various embodiments, both active and passive tags may be improved upon with respect to the drawbacks described above, while providing simple and low cost energy storage systems that are also more easily manufacturable. The polymer tag devices disclosed herein may be employed for communication, identification, shielding, connecting, fastening and/or any other suitable application.

Figure 1A:
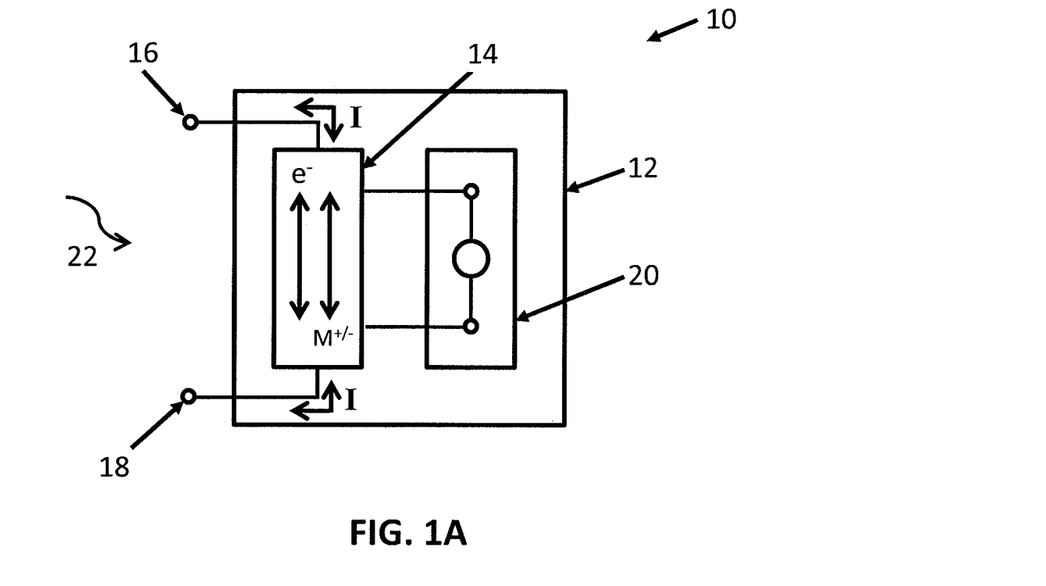
FIG. 1A is a schematic illustration of an apparatus having conductive polymers according to some embodiments.

Referring to FIG. 1A, a tag apparatus 10 comprises a substrate 12 and a conductive structure 14 formed on the substrate 12 according to some embodiments. The conductive structure 14 includes a layer of redox-active polymer film having mobile ions (M+/−) and electrons (e−). The conductive structure 14 further includes a first terminal 16 and a second terminal 18 configured to receive an electrical signal 22 therebetween, where the layer of redox-active polymer is configured to conduct an electrical current (I) generated by the mobile ions and the electrons in response to the electrical signal. The apparatus additionally comprises a detection circuit 20 operatively coupled, e.g., directly electrically connected, to the conductive structure 14 and configured to detect the electrical current (I) flowing through the conductive structure 14.

In some embodiments, the layer of redox-active polymer of the conductive structure 14 comprises a polymer selected from the group consisting of polyaniline, poly(anthraquinone), chloranil, poly(aminoanthraquinone), polyvinylanthraquinone, poly(1-aminoanthraquinone), poly(3,7-dialkylbenzol[1,2-b:4,5-b']dithiophene-4,8-dione-2,6-diyl), poly(1-naphthol), and poly(10-hexylphenothiazine-3,7-diyl).

In the illustrated tag apparatus 10 of FIG. 1A, the conductive structure 14 can include at least one electronic component selected from the group consisting of an antenna, a resistor, an inductor, a capacitor, a diode, a light-emitting element and a transistor.

In some embodiments, the tag apparatus 10 is a passive identification (ID) tag and the conductive structure 14 comprises an antenna having the first and second terminals 16 and 18 configured to receive the electrical signal 22, in the form of an electromagnetic (EM) electrical signal. For example, the tag apparatus 10 can be a passive RFID device having the conductive structure 14 comprising an antenna configured to receive a radio frequency electromagnetic electrical signal.

In embodiments where the tag apparatus 10 is an ID tag, an electronic component selected from the group consisting of a resistor, a capacitor, a diode and a transistor, or a combination thereof, can be used to store identification information. As used herein identification information can be any information, such as that which may be stored in an ID tag.

Still referring to FIG. 1A, the detection circuit 20 can include at least one of a voltage detection circuit or a current detection circuit that is electrically connected and is integrated on the same substrate 12 as the conductive structure 14. In embodiments where the tag apparatus 10 is an ID tag, the detection circuit 20 can be configured to detect the identification information associated with, the the conductive structure 14. In embodiments where the tag apparatus 10 is a passive ID tag, e.g., a passive RFID tag, the detection circuit 20 can include any one or more circuit components in RFID chips that are used for detecting the identification information, whose description can be found, for example, in U.S. Pat. No. 6,700,491 (hereinafter '491 patent), which is hereby incorporated by reference in its entirety, and particularly for the purpose of describing such components and chips.

The detection circuit 20 can include a detection circuit configured to detect the identification information from the tag apparatus 10 using a number of different ways. In some embodiments, the detection circuit 20 can be configured to detect a change in electrical conductivity of the redox-active polymer of the conductive structure 14 in response to a change in the temperature of the conductive structure 14 of 1° C. or greater, 5° C. or greater, or 10° C. or greater. In other embodiments, the detection circuit 20 is configured to detect a change in electrical conductivity of the redox-active polymer of the conductive structure 14 in response to a change in the relative humidity surrounding the conductive structure of 1% percent or greater, 5% percent or greater, or 10% percent or greater. In embodiments where the detection circuit 20 is configured to detect a change in electrical conductivity of the redox-active polymer in response to a change in the relative humidity, the layer of redox-active polymer can include a hygroscopic additive selected from the group consisting of chloride salts, sulfate salts, nitrate salts and/or organic salts to enhance the detection capability of the moisture.

Advantageously, because redox-active polymer film can be patterned into sheets having complex shapes, various components of the tag apparatus 10 including the detection circuit 20 and the conductive structure 14 can be formed from a a single sheet of redox-active polymer film. Thus, according to some embodiments, the detection circuit 20 comprises a layer of redox-active polymer film that integrally extends from the layer of redox-active polymer film of the conductive structure 14. That is, at least portions of the detection circuit 20 and the conductive structure 14 can comprise, or formed from, the same layer as the conductive structure 14.

Figure 1B:
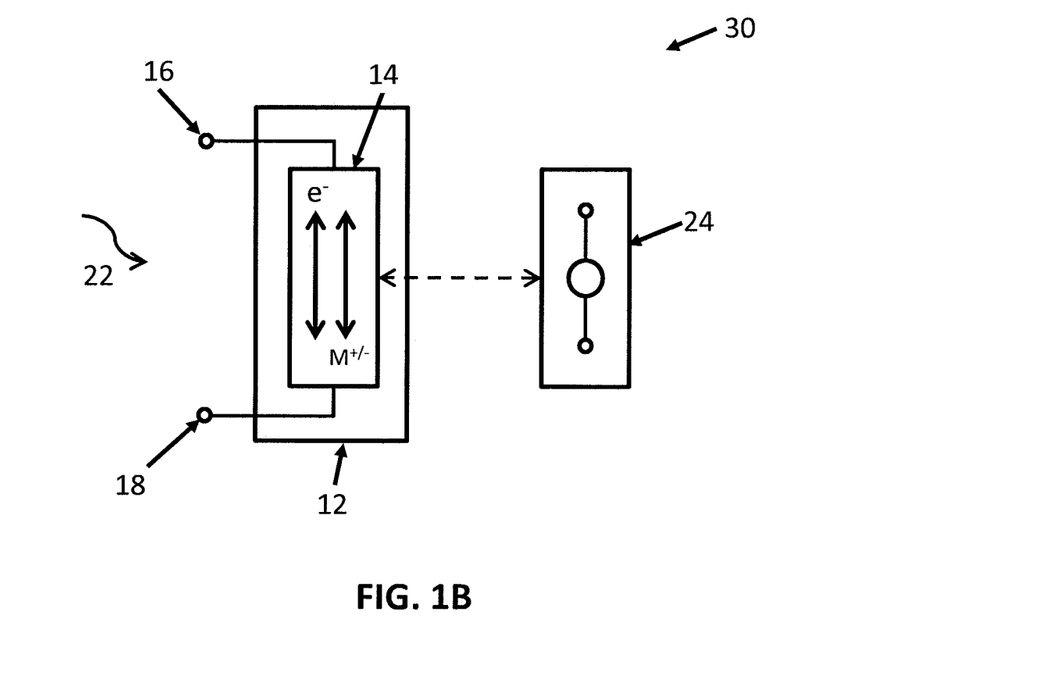
FIG. 1B is a schematic illustration of an apparatus having conductive polymers according to some other embodiments.

While in FIG. 1A, the detection circuit 20 is integrated with the conductive structure 14 on the same substrate 12, other arrangements are possible, as illustrated in a tag apparatus 30 of FIG. 1B. The tag apparatus 30 of FIG. 1B is similar to the tag apparatus 10 of FIG. 1A, except that the detection circuit 24 is physically separated from the substrate 12, on which the conductive structure 14 is formed. Unlike the tag device 10 of FIG. 1A, however, the detection circuit 24 is wirelessly coupled. For example, the detection circuit 24 can comprises one of a voltage detection circuit or a current detection circuit that is physically separated from the substrate. The detection circuit 24 can be configured to receive electromagnetic signal such as an electromagnetic signal (e.g., RF signal), for example, where the conductive structure 14 is configured to emit an electromagnetic signal. The detection circuit 24 can also be configured to receive photons (e.g., visible or infrared photons), for example, where the conductive structure 14 is configured to emit photons. In other embodiments, the detection circuit 24 can be configured to contact certain points of the conductive structure 14 or terminals.

Figure 2:
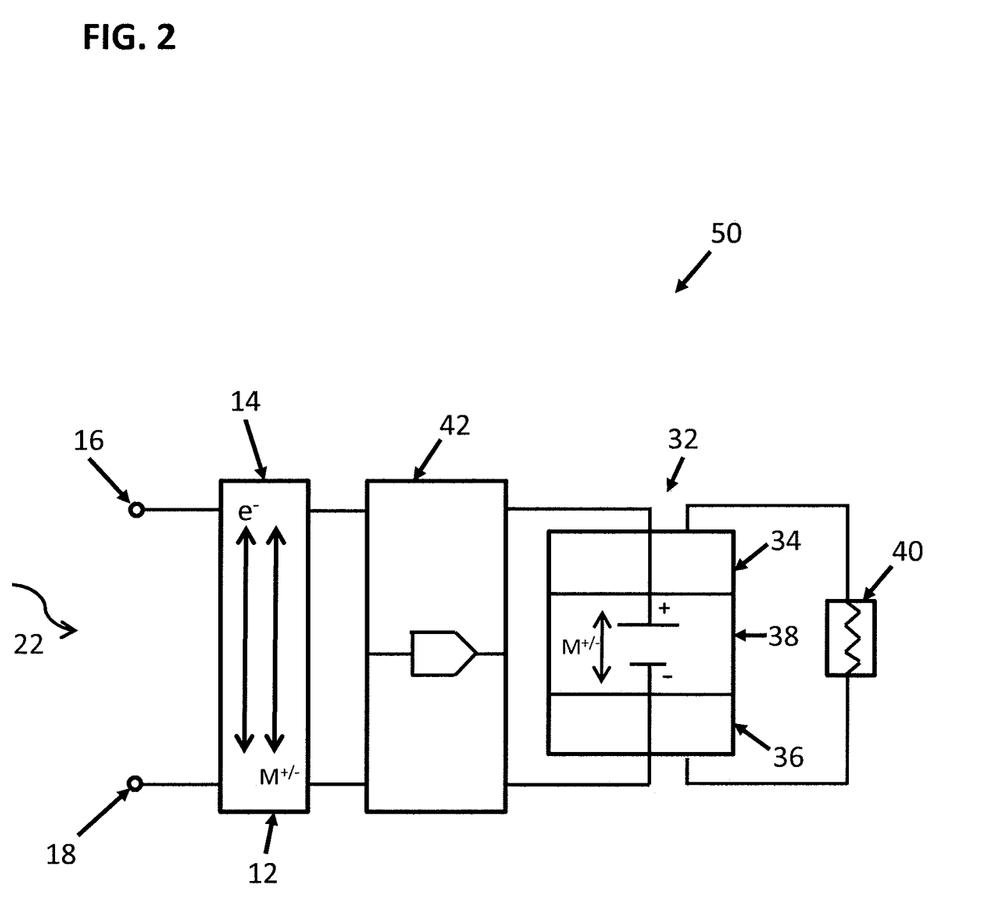
FIG. 2 is a schematic illustration of an apparatus having conductive polymers according to some other embodiments.

Referring to FIG. 2, an active tag apparatus 50 comprises an electrochemical energy storage device 32. The electrochemical storage device 32 comprises a first electrode layer 34 comprising a first redox-active polymer having mobile ions and mobile electrons and a second electrode layer 36 comprising a second redox-active polymer film having mobile ions and mobile electrons. The first electrode 34 has a first redox potential and the second electrode 36 has a second redox potential higher than the first redox potential. The electrochemical energy storage device 32 additionally comprises an electrolyte layer 38 interposed between the first electrode layer 34 and the second electrode layer 36. The electrolyte layer 38 includes a conductive polymer film configured to conduct ionic current by passing mobile ions therethrough between the first and second electrode layers 34 and 36, and the conductive polymer film is further configured to not conduct a substantial amount of electronic current. The active tag apparatus 50 additionally comprises a load device 40 operatively coupled to the storage device 32. Under a charge condition, the storage device 32 is configured to be charged through an ionic current flowing through the electrolyte layer between the first and second electrode layers 34 and 36. Under a discharge condition, the first electrode layer 34 is configured to be oxidized and the second electrode 36 is configured to be reduced such that an electronic current flows through the load device 40.

Still referring to FIG. 2, in some embodiments, the active tag apparatus 50 is an active ID device having an antenna configured to receive and transmit an electromagnetic electrical signal using energy from the storage device 32, where the active tag device 50 further comprises a conductive structure 14 having a first terminal 16 and a second terminal 18 and configured to receive an electromagnetic signal 22 therebetween. The conductive structure 14 comprises a redox-active polymer film having mobile ions (M+/M−) and electrons (e−) and configured to conduct an electrical current generated by the mobile ions (M+/M−) and the electrons (e−) in response to the electromagnetic signal 22. In these embodiments, the active tag apparatus 50 additionally comprises a conversion circuit 42 configured to convert the electromagnetic signal 16 into a DC voltage. The electrochemical energy storage device 32 is configured to be charged in response to the DC voltage developed by mobile ions passing between the first and second electrode layers 34 and 36 in response to the DC voltage.

Still referring to FIG. 2, in some embodiments, the load device 40 comprises an electromagnetic wave transmission device, such as an RF transmitter. In other embodiments, the load device 40 comprises an electroluminescent device, such as a photodiode. In some embodiments, the electroluminescent device comprises at least one of the first and second redox-active polymer films of the electrochemical energy storage device 32.

In some other embodiments, the load device 40 comprises an ID chip configured to transmit identification information. In some embodiments, the load device 40 comprises an RFID chip which can include any one or more circuit components in RFID chips that are that are commonly included in such chip, whose description can be found, for example, in the '491 patent.

In some embodiments, by choosing a value of impedance or the resistance of the load device 40, along with a combination of the redox-active polymers having the properties described herein, the load device 40 can be configured to dissipate, e.g., by transmitting an RF signal, the energy stored in the storage device 32 within a predetermined time period. That is, the tag apparatus can be configured to have an active time period during which an electromagnetic or a light signal can be transmitted. This time period can be altered based on the size, number of layers, redox-active polymer chemistry. For example, the load device is configured to transmit an electromagnetic signal or a light signal for a predetermined time period between about 10 seconds and about 24 hours, or between about 1 day and 10 days, or between about 10 days and about 1 year. As a non-limiting example, depending on the application, the tag apparatus may be configured as a small ($\leq 1$ cm$^2$, for instance between 0.1 cm$^2$ and 1 cm$^2$), single layer redox polymer film having a low characteristic charge capacity (e.g. $\leq 100$ Ah/kg). As used herein, Ah refers to Amp-hour.

Alternatively, for applications suitable for longer "active" time periods, the tag apparatus may be configured as a larger (e.g. $\geq 100$ cm$^2$, for instance between 100 cm$^2$ and 10,000 cm$^2$) multi-layer (e.g., $\geq 3$ layers) system comprising redox polymer with high characteristic charge capacities (e.g. $\geq 300$ Ah/kg). For example, a 1 cm$^2$ tag having a thickness of 300 µm with an energy density of 100 Wh/L provides enough power to operate a RFID label for several read cycles or continuously power antenna signal of 100 mW for almost 2 minutes. As used herein, Wh refers to Watt-hour. As another non-limiting example, a 25 cm$^2$ tag having a thickness of 0.2 cm (five layers of 300 µm thick cells) with an energy density of 300 Wh/L provides enough power to operate a label for over 10 hours.

Still referring to FIG. 2, advantageously, because redox-active polymer film can be patterned into sheets having complex shapes, various components of the active tag apparatus 50 including the detection circuit load device 40, the storage device 32, the conversion circuit 42 and the conductive structure 14 can be formed from a single sheet of redox-active polymer film. Thus, according to some embodiments, the storage device 32 may have one of the first electrode 34 and/or the second electrode 36 comprising a layer of redox-active polymer film that integrally extends to form at least portions of the conductive structure 14, detection circuit load device 40 and the conversion circuit 42.

In the following, referring to FIG. 3, an electrochemical cell 100, similar to the electrochemical storage device 32 of FIG. 2, is discussed in detail, according to embodiments. The electrochemical cell 100 includes a negative electrode, or anode 110, which comprises a redox polymer having a standard redox potential Ea. The electrochemical cell 100 additionally includes a positive electrode, or cathode 120, which comprises a redox polymer having a standard redox potential Ec wherein Ec is generally more positive than Ea. A solid-state ion-exchange polymer electrolyte or ionically conductive polymer or gel 130 is situated between the anode 110 and cathode 120 permitting ionic conduction between anode 110 and cathode 120. During discharge, the oxidation half-reaction may take place at the anode 110. The electrons produced in the oxidation process at the anode 110 may flow to a load 140 (associated with the device or apparatus) and return to the cathode 120 to facilitate the reduction of the redox polymer at the cathode 120. During the charge process via an external power source, the redox polymer at the anode 110 is reduced and the redox polymer at the cathode 120 is oxidized.

In some embodiments, the thickness of the anode 110 and cathode 120 may be 200 µm or less, for instance between 20 µm and 200 µm, the ion-exchange polymer 130 may be 100 µm or less, for instance between 10 µm and 100 µm, and the thickness of the cell 100 may be 500 µm or less, for instance between 50 µm and 500 µm. In another embodiment, the thickness of the anode 110 and cathode 120 may be 125 µm or less, for instance between 12.5 µm and 125 µm, the ion-exchange polymer 130 may be 50 µm or less, for instance between 5 µm and 50 µm, and the thickness of the cell 100 may be 300 µm or less, for instance between 30 µm and 300 µm.

In some embodiments, the electrochemical cell 100 may comprise protective compounds functioning to protect redox polymers from over-charge and/or over-discharge. Over-discharge may result in irreversible reduction of a positive electrode redox polymer and/or irreversible oxidation of a negative electrode redox polymer. Likewise, over-charge may result in irreversible oxidation of a positive electrode redox polymer and/or irreversible reduction of a negative electrode redox polymer. For example, redox shuttles or any other suitable compounds may be reversibly reduced or oxidized instead of over-charging or over-discharging a redox polymer of the anode 110 or cathode 120. These protective compounds may be present in the negative electrode, positive electrode or a combination thereof. Non-limiting examples of protective compounds include phenothiazine, iodine, tri-iodine, quinones (e.g. benzoquinones, naphthoquinones, and anthraquinones), their derivatives and combinations thereof.

In some embodiments, a redox polymer may be a constituent of a copolymer or polymer blend. In addition to other properties, blending and/or copolymerization may improve the mechanical stability of the electrode during fabrication and/or during long-term charge-discharge cycling. Some non-limiting examples of copolymer or polymer blends are described below.

For example, a suitable polymer blend may be provided to enable thermoplastic manufacturing processes (e.g., thermoforming). For example, in some conductive polymers that are not thermoplastics (e.g., thermoformable) a plasticizer (e.g. esters of polycarboxylic acids, phthalate esters and so on) and/or other suitable additives that increase plasticity or fluidity may be added as a component of a co-polymer or polymer blend.

As another example, a suitable polymer may be provided to increase electrical conductivity, in circumstances where the redox-active polymer may have limited electrical conductivity without blending. In these embodiments, a more conductive polymer may be blended or copolymerized with a redox-active polymer. In some embodiments, polymers with higher conductivities may also be redox polymers themselves. For example, linear-backbone "polymer blacks" like polyacetylene, polypyrrole, and polyaniline may provide increased electrical conductivity. Non limiting examples include polyfluorenes, polyphenylenes, polypyrenes, polyazulenes, polynaphthalenes, polyacetylenes, polyphenylenevinylenes, polypyrroles, polycarbazoles, polyindoles, polyazepines, polyanilines, polythiophenes, polyphenylenesulfides, their derivatives and combinations thereof.

In some embodiments, it may be preferable to make the polymer film more porous in order to facilitate the ion exchange of the polymer redox states. Ionic conductivity of an electrode may be improved with the use of any suitable additive providing increased free volume and/or porosity within a polymer electrode. In some embodiments, the additive may be a component of a copolymer or polymer blend. For example, manufacturing methods that incorporate porosity may include: incorporating bulky, contorted monomer structures resulting in inefficient polymer chain packing (e.g. tetrahedral monomers), blending a redox-active polymer with a second polymer which is soluble in a solvent, using gas phase foaming agents, using chemically decomposing foaming agents, inducing phase separation in the presence of non-solvents, applying shear stresses sufficient to cause fibril formation and coalescence or any other suitable method known in the polymer engineering arts. As another example, the redox-active polymer may have limited mechanical stability alone. In some embodiments, a material providing increased mechanical stability may be blended or copolymerized with a redox-active polymer. For example, two polymers may be blended to provide improved fiber rheology resulting in a relatively high degree of mechanical stability. In some embodiments, a separate membrane with high mechanical stability may be provided in layers of the battery. As yet another example, a redox-active polymer may be blended with a polymer which provides improved adhesion to a substrate. In some embodiments, it may be desirable to improve adhesion to a current collector, separator and/or some feature of the associated device or apparatus.

Figure 3:
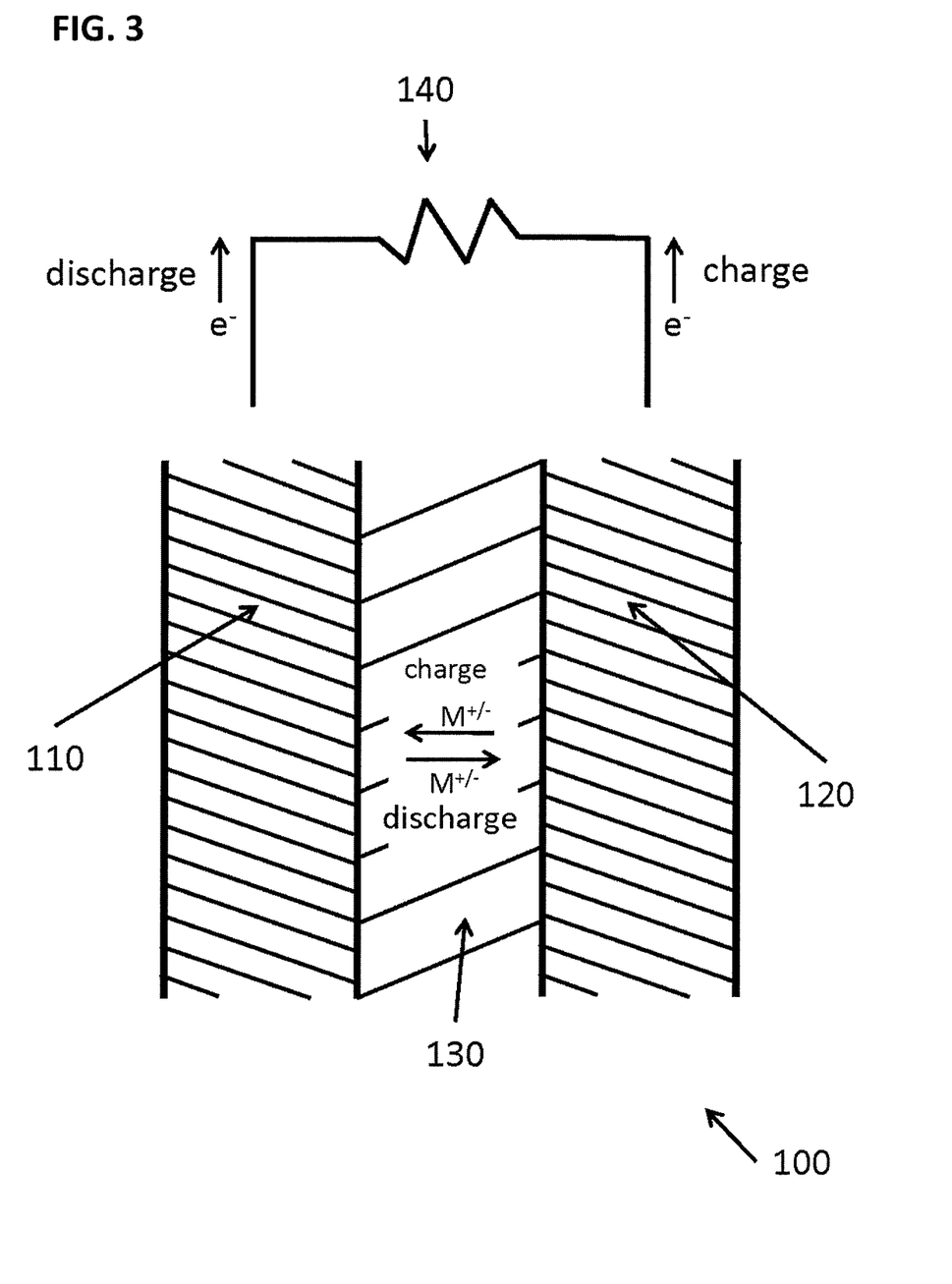
FIG. 3 is a schematic illustration of an apparatus having conductive polymers according to some other embodiments.

Still referring to FIG. 3, in some embodiments, the redox polymers may be in contact with a conductive sheet or film to provide increased electrical conductivity and/or mechanical stability. This may be performed by any suitable method known in the art including lamination, film casting, film coating, electropolymerization, physical vapor deposition, and so on. For example, the redox polymer may be a metallized film wherein the redox polymer is coated on a thin layer of metal acting as a current collector. In some embodiments, the redox polymer may be in contact with a non-conductive sheet or film providing mechanical stability, as some feature of the device and/or as a general separator. In some embodiments, the system may comprise a plurality of electrochemical cells 100 formed in layers wherein the negative electrode or anode 110 of a first cell 100 is electrically connected to an anode of a second cell and the positive electrode or cathode 120 of the first cell 100 is electrically connected to a cathode of a third cell. Such a configuration may be repeated any suitable number of times and numerous other arrangements are also possible, depending on the specifics of the application.

In some embodiments, polymers may be synthesized by any suitable method known in the art, including but not limited to chemical oxidation or reduction, metal complex dehalogenation, metal complex coupling, step-growth polymerization, chain-growth polymerization, and electropolymerization, to name a few.

Still referring to FIG. 3, in some embodiments, the electrochemical cell 100 or plurality of electrochemical cells 100 and its associated device, apparatus or system (e.g. electric vehicles, consumer electronics etc.) may be manufactured by an injection molding process, additive manufacturing process and/or any other suitable manufacturing method.

In some embodiments, the polymer may comprise dopants modifying the electrical conductivity or other properties. The dopants may be incorporated into the redox polymers by any suitable method. For example, the dopants may include charged species which may be incorporated during electrochemical oxidation and/or reduction processes. In a feature of some embodiments, oxidative and/or reductive doping may improve the electrical conductivity of the redox polymer. In some embodiments, the redox polymer may be activated before or after cell 100 assembly. For example, the redox polymer may be oxidized or reduced before integration into cell 100 in an ionically conductive medium comprising preferred dopant species, if any.

In some embodiments, the redox polymer structure may comprise an electrically conductive polymer backbone with functional side groups having redox activity. In some embodiments, the redox polymer may have a structure wherein the preferred redox-active groups are part of a main electrically conductive polymer chain. The polymer includes a redox-active group that can exist in at least two oxidation states. In some embodiments, redox-active groups of the organic polymer may comprise cyclic or acyclic heteroatoms including but not limited to O, S, N, P, transition metals, metallocenes and combinations thereof. For example, the redox-active groups may include cyclic, polycyclic and/or acyclic structures comprising alkanes, alkenes, benzenes, styrenes, alcohols, ketones, esters, ethers, amines, amides, imines, imides, alkylamines, pyridines, thiols, thiophenes, thiones, thials, phenothiazines, sulfides, sulfoxides, phosphines, phosphones, halides, quinones, their derivatives and combinations thereof.

In some embodiments, the redox-active group may form quinoid structures. For example, structures may include benzoquinones, naphthoquinones, anthraquinones, hydroquinones, aminoquinones, polyvinylquinones, polycyclic quinones, their derivatives or combinations thereof.

In some embodiments, pairs of redox polymers are selected to maximize the potential difference between the cathode redox polymer potential Ec and the anode redox polymer potential Ea. As non-limiting examples, the redox polymer at the anode 110 may comprise polyaniline, polyanthraquinone, chloranil, poly(aminoanthraquinone), polyvinylanthraquinone, poly(1-aminoanthraquinone), poly(3,7-dialkylbenzo[1,2-b:4,5-b']dithiophene-4,8-dione-2,6-diyl), or combinations thereof. These redox polymers at the anode 110 may be paired to redox polymers at the cathode 120 such as but not limited to poly(1-naphthol), poly(10-hexylphenothiazine-3,7-diyl), or combinations thereof.

According to various embodiments, examples of redox polymer pairs are provided in TABLE 1, according to embodiments, along with the associated properties. These values represented in TABLE 1 have been estimated considering a charge fraction value of 1, no packing overweight, and no current collector. It will be appreciated that various combinations of redox polymers may be selected to maximize the potential difference between the cathode (positive electrode) redox polymer potential Ec and the anode (negative electrode) redox polymer potential Ea. According to some embodiments, a given cathode/anode pair can be selected to have a difference between the Ec and the Ea (Ec-Ea), which can be equal to a cell open circuit potential (OCP), between about 1.0V and about 3.0V, between about 1.5V and about 3.0V, or between about 2.0V and about 3.0V. Additionally, the redox polymer pairs may be selected to maximize the associated cell potential, specific energy and energy density of the system. According to some embodiments, a given cathode/anode pair can be selected to have a specific energy density between about 100 Wh/kg and about 250 Wh/kg, between about 150 Wh/kg and about 250 Wh/kg or between about 200 Wh/kg and about 250 Wh/kg. According to some embodiments, a given cathode/anode pair can be selected to have an energy density between about 100 Wh/L and about 250 Wh/L, between about 150 Wh/L and about 250 Wh/L or between about 200 Wh/L and about 250 Wh/L. The redox polymer pairs provided in TABLE 1 are not intended to be limiting, but instead demonstrate the ability to tune the properties of the redox-active polymer battery by careful selection of redox polymer pairs.

TABLE 2

| Polymer Backbone | Ionic Compound | Conductivity (S/cm) |
| --- | --- | --- |
| Poly(trimethylene carbonate) | Lithium Hexafluoroantimonate | 1E−05 |
| Poly(siloxanes-g-oligo(ethylene oxide)) | Lithium Triflate | 7E−04 |
| Polyethylene oxide | Lithium Perchlorate | 5E−04 |
| Polyethylene oxide | Potassium Bicarbonate | 5E−07 |

The compositions provided in TABLE 2 are not intended to be limiting, but instead demonstrate the ability to tune the properties of the ion-exchange materials by selection of both polymer backbone and ionic compound. In some embodiments, a composite solid electrolyte may be employed wherein a filler is used to decrease the interaction between the ions in the electrolyte and the polymeric chains. Not to be bound by any particular theory, but if this interaction is too strong, the ionic mobility and ionic conductivity in the electrolyte may decrease. Non-limiting examples include: polyethylene oxide (PEO)-potassium nitrate ($KNO_3$) electrolyte filled with silicon oxide ($SiO_2$) particles, polyeth-

TABLE 1

| Negative Electrode | Positive Electrode | Ea (V vs Ag/AgCl) | Neg. Electrode Capacity (Ah/kg) | Ec (V vs Ag/AgCl) | Pos. Electrode Capacity (Ah/kg) | Cell OCP (V) | Specific Energy (Wh/kg) | Energy Density (Wh/L) |
| --- | --- | --- | --- | --- | --- | --- | --- | --- |
| Poly(aminoanthraquinone) | Poly(10-hexylphenothiazine-3,7diyl) | −0.7 | 240 | 0.8 | 189 | 1.5 | 146 | 175 |
| Poly(aminoanthraquinone) | poly-1-naphthol | −0.4 | 240 | 1.3 | 186 | 1.7 | 146 | 176 |
| polyaniline | poly-1-naphthol | −0.1 | 288 | 1.3 | 186 | 1.4 | 136 | 171 |
| polyanthraquinone | poly-1-naphthol | −0.9 | 258 | 1.3 | 186 | 2.2 | 197 | 236 |
| Poly(3,7-dialkylbenzo[1,2-b:4,5-b']dithiophene-4,8-dione-2,6-diyl) | Poly(10-hexylphenothiazine-3,7diyl) | −1.1 | 244 | 0.8 | 189 | 1.9 | 166 | 199 |
| Poly(3,7-dialkylbenzo[1,2-b:4,5-b']dithiophene-4,8-dione-2,6-diyl) | poly-1-naphthol | −1.1 | 244 | 1.3 | 186 | 2.4 | 208 | 250 |
| polyvinylanthraquinone | Poly(10-hexylphenothiazine-3,7diyl) | −0.8 | 238 | 0.8 | 189 | 1.6 | 138 | 166 |
| polyvinylanthraquinone | poly-1-naphthol | −0.8 | 238 | 1.3 | 186 | 2.1 | 180 | 216 |

Still referring to FIG. 3, in some embodiments, the charge carriers exchanged by the ion-exchange polymer electrolyte 130 may be selected based on redox polymer chemistry, preferred ions exchanged or other suitable chemical and/or mechanical properties. Non-limiting examples of ions that may be exchanged include positive ions (e.g. $N^+$, $Li^+$, $Na^+$, $K^+$, $R_4N^-$, etc.), negative ions (e.g. $OH^-$, $ClO_4^-$, $Cl^-$, $BF_4^-$, $SbF_6^-$, $HCO_3^-$, $CF_3SO_3^-$, $(CF_3SO_2)_2N^-$, etc.) or a combination thereof. Non-limiting examples of ion exchange polymers include polyethylene oxide (PEO), poly(siloxanes-g-oligo(ethylene oxide)), poly(trimethylene carbonate), poly(oxymethylene), poly(propylene oxide), poly(oxymethylene-oligo-oxyethylene), and/or poly(dimethyl siloxane).

Non-limiting examples of electrolyte compositions and estimated conductivities are provided in TABLE 2.

ene oxide (PEO)-lithium bis(trifluoromethanesulfonimide) ($Li(CF_3SO_2)_2$) filled with barium titanate ($BaTiO_3$), and/or polyethylene oxide (PEO)-lithium perchlorate ($LiClO_4$) filled with aluminum oxide ($Al_2O_3$). These examples are not intended to be limiting, as numerous other combinations are also possible.

Figure 4:
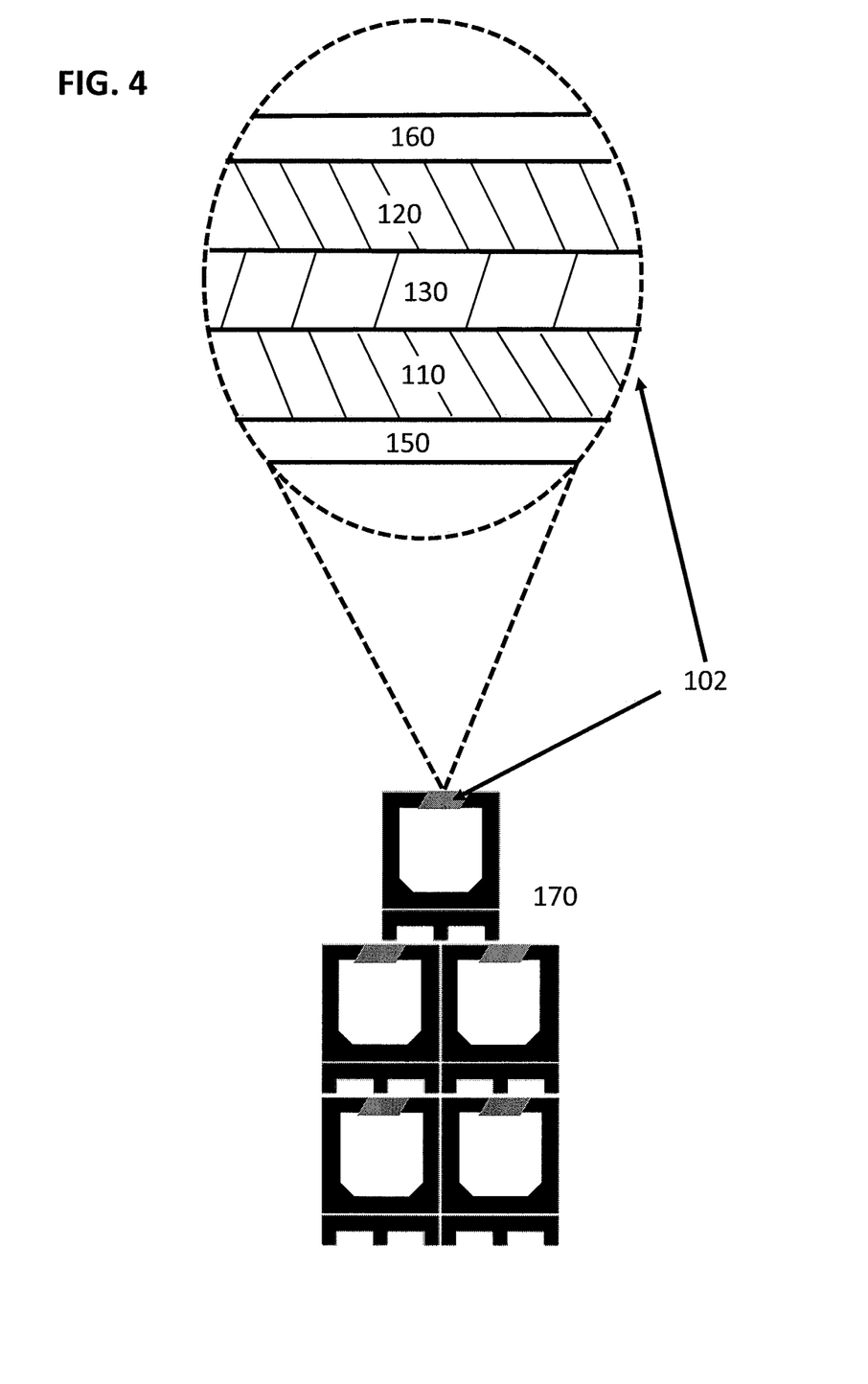
FIG. 4 is an illustration of a tag device having conductive polymers according to some embodiments.

FIG. 4 illustrates a tag device 102 according to some embodiments. The tag device 102 comprises a first anodic layer 110. The tag device may store and deliver energy via electrochemical redox processes. The first anodic layer 110 comprises a redox-active polymer film is capable of being oxidized during a discharging operation of the tag device 102. The first anodic redox-active polymer of first anodic layer 110 may be characterized by a first redox potential. A second cathodic layer 120 comprises a redox-active polymer film capable of being reduced during a discharging operation. The second cathodic redox-active polymer may be characterized by a second redox potential. An electrolyte layer 130 is situated between the first anodic layer 110 and second cathodic layer 120. The electrolyte layer 130 comprises an ionically conductive polymer film for conducting ions between the first anodic layer 110 and second cathodic layer 120. The electrolyte layer 130 may be solid-state or in some embodiments, may be a gel. The electrolyte layer 130 does not conduct a substantial amount of electronic current.

In some embodiments, the redox-active polymers are selected to reversibly store electrochemical energy. During a charging operation, the anodic redox-active polymer is capable of being reversibly reduced and the cathodic redox-active polymer is capable of being reversibly oxidized. The presence of an electromagnetic field may provide the power for the charging operation via induction. In some embodiments, redox-active polymers may be provided in the form of an induction coil.

The anodic and cathodic redox active polymers may be selected from the group of substituted or unsubstituted polyacetylenes, polypyrroles, polyanilines, polyphenylenes, polypyrenes, polyazulenes, polynaphthalenes, polyphenylenevinylenes, polycarbazoles, polyindoles, polyazepines, polythiophenes, polyphenylenesulfides, polymerized conjugated carbonyls, polymerized conjugated amines, polynitroxyls, polyorganodisulfides, polythioethers, electroluminescent organic semiconductors, their derivatives, copolymers and combinations thereof. In some embodiments, the polymer chemistries and systems may be selected from those disclosed in U.S. Provisional Patent Application No. 61/794,901 entitled "Integrable Redox-Active Polymer Batteries," which is incorporated herein by reference in its entirety, and particularly for the purpose of describing anodic and cathodic redox active polymers.

Still referring to FIG. 4, the first anodic layer 110 and the second cathodic layer 120 are both electronically conductive and ionically conductive. The electrolyte layer 130 is capable of conducting ions between the first anodic layer 110 and the second cathodic layer 120; however, electrolyte layer 130 is not capable of electronic conduction. In some embodiments, the first redox potential associated with the first anodic layer 110 is lower than the second redox potential associated with the second cathodic layer 120. For example, the difference in redox potential between the anodic and cathodic polymers may be selected to be greater than 0.1 volt, e.g., greater than 0.5 volt or greater than 1.0 volt. In some embodiments, the potential of the redox couples may be greater than 2 volts.

In some embodiments, the anodic layer and cathodic layer may comprise dopants to maintain charge neutrality and/or modify the electrical conductivity. In some embodiments, the redox polymer may be activated before or after assembly of the tag device. For example, the anodic and cathodic layers may be initially manufactured in a doped state. For other applications, the anodic and cathodic layers may be initially manufactured in an undoped, or discharged, state.

Still referring to FIG. 4, in some embodiments, the thickness of the anodic layer 110 and cathodic layer 120 may each be about 300 µm or less, for instance between about 30 µm and about 300 between about 20 µm and about 200 µm or between about 10 µm and about 100 µm, while in the same embodiment the electrolyte layer 130 may be 100 µm or less, for instance between about 10 µm and about 100 µm, between about 7.5 µm and about 75 µm or between about 5 µm and about 50 µm. In some embodiments, the thickness of the anodic layer 110 and cathodic layer 120 may be 75 µm or less, for instance between about 7.5 µm and about 75 µm, between about 5 µm and about 50 µm or between about 2.5 µm and about 25 µm, and in the same embodiment the electrolyte layer 130 may be 50 µm or less, for instance between about 5 µm and about 50 µm, between about 2.5 µm and about 25 µm or between about 1 µm and about 10 µm. For simplicity, the illustrated embodiment of FIG. 1 depicts a single anodic layer 110, a single cathodic layer 120 and a single electrolyte layer 130; however any suitable number of layers may be provided depending on the application. For example, the anodic layer of a first cell is electrically connected to an anodic layer of a second cell and the cathodic layer 120 of the first cell is electrically connected to a cathodic layer of a third cell. Such a configuration may be repeated any suitable number of times and numerous other arrangements are also possible, depending on the specifics of the device, apparatus or system. In some embodiments, a plurality of layers may be provided. Furthermore, single tag devices may be provided singularly or be further integrated with other films to form more complex tag devices.

Still referring to FIG. 4, the tag device 102 may further comprise a protective layer 160. The protective layer 160 may be a non-conducting polymer situated as the uppermost layer of the tag device 102. For example, the protective layer may comprise polyethylene, polypropylene, epoxy, polyester, derivatives or combinations thereof.

Still referring to FIG. 4, in some embodiments, the tag device 102 further comprises an adhesive layer 150 for affixing the tag device 102 to a parent object. In the illustrated embodiment of FIG. 4, the parent object 170 may be a product or collection of products to which the tag device 102 is affixed for the purpose of inventory control. For example, the tag device 102 may be affixed to an inventory storage bin 170. The product storage bin 170 may be stored in the presence of a radio-frequency electromagnetic field which continually energizes, or charges, the tag device 102. When the product bin 170 is moved from the transmitting radius of the radio-frequency electromagnetic field, the tag device 102 will continue to emit identification information while in transit. It may be appreciated that the stored electrochemical energy may be released over application-relevant time period. For example, the tag device 102 may be provided to emit identification information in the range of minutes to hours after being removed from the transmitting radius of the radio-frequency electromagnetic field. This time period can be altered based on the size, number of layers, redox-active polymer chemistry and desired operating conditions. As another example, an RFID tag device affixed to a product may remain active for a designed time period after scanning at a checkout counter, thus avoiding inventory loss. The time period the tag remains active may be set based on the charge density of the redox active polymer and/or the number of redox active polymer layers of the tag device. As yet another example, the tag device may comprise a conducting polymer with electroluminescent properties. The tag device may be designed to glow for a predetermined time period after exposure to a radio-frequency electromagnetic source.

In some embodiments, the tag device comprising a conducting polymer is configured to electrically connect two components of a parent object that otherwise may only be in nominal electrical contact. In some embodiments, the conductive tag devices have the advantage of being die-cut into simple electronic circuits that are valuable for connecting multiple electronic components by simple adhesion.

In some embodiments, the tag device may be designed to provide shielding from electromagnetic interference, electrostatic discharge, radio frequency interference or a combination thereof. For example, a thin layer tag device may prevent electromagnetic damage of a parent object to which it is affixed e.g. act as a simple Faraday cage. The tag device may be provided as an electrically conductive tape or adhesive employed as a low cost way to seal parent object components (e.g. automotive products) and simultaneously prevent electromagnetic and/or electrostatic damage to the parent object and/or parent object component to which the tag device is affixed. The effectiveness of electromagnetic interference shielding is measured by the attenuation of the tag device i.e. the ratio between field strength with and without the presence of the tag device. For example, the tag device may provide shielding greater than 10 dB. In some embodiments, the tag device may provide shielding greater than 50 dB.

The redox polymer systems may be selected based on a change in their properties due to environmental conditions. For example, the polymer film may be selected such that the charge transport processes within the film are significantly dependent on temperature i.e. the redox polymer resistance has strong dependence on temperature. Therefore one could build a simple circuit that records the temperature history of a product to which it's affixed which has utility for applications related to perishable goods. As another example, there may be a parametric relationship with relative humidity which may for example, be useful to sense the relative humidity history on electronics, etc.

Still referring to FIG. 4, in some embodiments, the tag device further comprises an auxiliary low power component (which may be a polymer itself or for example, a metal antenna or silicon ship). During a discharge process, energy is delivered to the low power component of the tag device. During discharge, an oxidation reaction takes place at the anodic layer 110. The electrons produced in the oxidation process at the anode 110 may flow to a low power component associated with a low power component associated with the tag device and return to the cathodic layer 120 to facilitate the reduction of the redox polymer at the cathode layer 120. The tag component may be selected from the group of a circuit, an antenna, a memory chip or a combination thereof. The stored energy is delivered to the low power tag component provided for the transmission of wireless signals. Or alternatively, the stored energy is delivered to the low power tag component provided for storage of identification information. Or alternatively, the stored energy is delivered to the low power tag component provided for signal processing, analysis of environmental conditions or other valuable electronic applications. In some embodiments, these components may be redox active polymers.

In some embodiments, the redox-active polymers may be provided as part of a composite tag device. A component of the composite may provide a structural feature, mechanical strength and/or a function relevant to tag device operation. Components of the composite may be formed of any suitable material (e.g. carbon, metal, glass and so on), any suitable shape (e.g. fibers, woven, whiskers, particles, porous matrix and so on), and may also provide any suitable function (e.g. mechanical strength, electrical conduction, ionic conduction, etc.). For example, the composite may comprise carbon fiber, fiber glass, metal whiskers, carbon particles, woven metals and or any other suitable material.

The tag device may be formed by a die-cutting manufacturing process wherein a shaped blade cuts a large polymer film sheet into smaller predetermined shapes, the large polymer film sheet comprising the first anodic layer, the second cathodic layer and the electrolyte layer. Other low cost film manufacturing approaches may be employed including roll-to-roll processing, roll slitting to cut a larger film or roll into smaller predetermined shapes, etc.

In some embodiments, additive manufacturing techniques may be employed to produce a tag device in virtually any shape. For example, a digital model of the tag device may be designed and successive layers may be laid down in a pattern corresponding to the model. For example, successive layers of an anodic layer, an electrolyte layer, a cathodic layer, may be formed by a plurality of nozzles associated with an additive manufacturing system.

Some embodiments provide a method for manufacturing a tag device, wherein the method comprising a first step of providing an anodic layer comprising a redox-active polymer film. An electrolyte layer comprising an ionically conductive polymer film for conducting ions may then be provided such that a first side of the ionically conductive polymer film contacts a first side of the anodic layer. A cathodic layer comprising a redox-active polymer film may then be layered such that the second side of the ionically conductive polymer contacts a first side of the cathodic layer. The resulting tri-layer sheet may then be cut into smaller predetermined shapes.

In some embodiments, electrical circuit elements may be included or cut directly into the films. For example, the predetermined shapes may be any type of basic circuit element such as an antenna, a capacitor, a resistor, an inductor, a battery, an electroluminescent component and so on. Tag devices of varying complexity may be generated simply by layering multiple sheets of thin layers comprising conductive and/or redox-active polymers followed by die-cutting into the predetermined shape based on the desired application. As a simple example of a tag device 210 depicted in FIG. 5, a polymer battery 220 may comprise a battery element 220 comprising an anodic layer, electrolyte layer and a cathodic layer. The tag device 210 may further comprise an antenna element 230 which is shaped and adapted for the transmission of electromagnetic waves.

Figure 5:
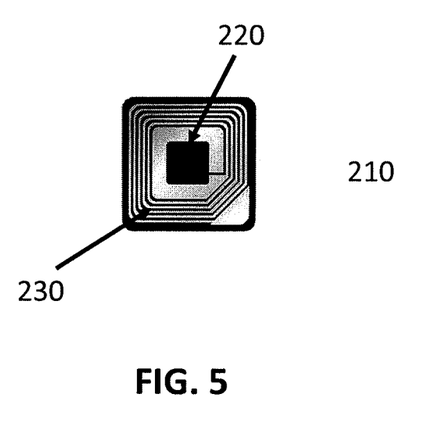
FIG. 5 is an illustration of a tag device having conductive polymers according to some other embodiments.

Still referring to FIG. 5, in some embodiments, the antenna element 230 is a single layer comprising a conductive and/or redox polymer. In such embodiments, the battery element 220 and antenna element 230 may be manufactured separately according to a die-cutting process wherein the single layer antenna element 230 is die-cut from a larger single-layer sheet and battery element 220 is die-cut from a larger tri-layer sheet. Once the circuit elements have been separately formed, they may be contacted to compose the singular tag device. In other embodiments, the antenna element 230 may comprise an anodic layer, electrolyte layer and a cathodic layer. In such embodiments, both the battery element 220 and circuit element 230 may be cut from a singular larger sheet in the predetermined shape of the tag device 210. It may be appreciated that die-cutting of thin film layers from larger sheets provides a simple, low-cost manufacturing process as opposed to, for example, specialized printing or other more complex manufacturing techniques.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A tag apparatus, comprising: a substrate; a conductive structure formed on the substrate comprising a first terminal and a second terminal configured to receive an electrical signal therebetween, wherein the first terminal and the second terminal are provided at opposing ends of the conductive structure such that the conductive structure is continuous between the first terminal and the second terminal, wherein the conductive structure comprises a redox-active polymer film having mobile ions and mobile electrons and the redox-active polymer film is configured to conduct an electrical current generated by the mobile ions and the mobile electrons in response to the electrical signal; and a detection circuit operatively coupled to the conductive structure and configured to detect the electrical current flowing through the conductive structure, wherein the detection circuit is further configured to detect and store identification information of the tag apparatus; wherein the redox-active polymer film integrally extends from the conductive structure to at least a portion of the detection circuit; and wherein the detection circuit is configured to detect a change in electrical conductivity of the redox-active polymer film in response to a change in the temperature of the conductive structure of 1° C. or greater or a change in the relative humidity surrounding the conductive structure of 1 percent or greater.

2. The tag apparatus of claim 1, wherein the conductive structure comprises at least one of an antenna, a resistor, an inductor, a capacitor, a diode, a light-emitting element and a transistor.

3. The tag apparatus of claim 1, wherein the conductive structure is an antenna configured to receive an electromagnetic electrical signal.

4. The tag apparatus of claim 3, wherein the tag apparatus is a passive identification (ID) device having the antenna configured to receive a radio frequency electromagnetic electrical signal.

5. The tag apparatus of claim 1, wherein the redox-active polymer film comprises a polymer selected from the group consisting of polyaniline, poly(aminoanthraquinone), polyvinylanthraquinone, poly(l-aminoanthraquinone), poly(3,7-dialkylbenzol[1,2-b:4,5-b']dithiophene-4,8-dione-2,6-diyl), poly(1-naphthol), and poly(10-hexylphenothiazine-3,7-diyl).

6. The tag apparatus of claim 5, wherein the redox-active polymer film comprises a hygroscopic additive selected from the group consisting of a chloride salt, a sulfate salt, a nitrate salt and an organic salt.

7. The tag apparatus of claim 1, wherein the detection circuit comprises at least one of a voltage detection circuit, a current detection circuit, a photon detection circuit, and an electromagnetic signal detection circuit that is physically separated from the substrate.

8. The tag apparatus of claim 1, wherein the detection circuit comprises one of a voltage detection circuit or a current detection circuit that is electrically connected and integrated on the substrate.

9. The tag apparatus of claim 8, wherein the detection circuit integrally extends from the conductive structure.

10. The tag apparatus of claim 3, wherein the tag apparatus is an active ID device having the antenna configured to receive and transmit an electromagnetic electrical signal using energy from an integrated storage device, the tag apparatus further comprising:

a conversion circuit configured to convert the electromagnetic electrical signal into a DC voltage; and
the storage device having a first electrode layer and a second electrode layer configured to receive the DC voltage, the storage device further comprising an electrolyte layer interposed between the first electrode layer and the second electrode layer, wherein the electrolyte layer comprises a conductive polymer film configured to pass mobile ions therethrough,
wherein the storage device is configured to be charged in response to the DC voltage developed by mobile ions passing between the first and second electrode layers through the electrolyte layer in response to the DC voltage.

11. The tag apparatus of claim 1, wherein the redox-active polymer film comprises an anode material selected from the group consisting of polyaniline, poly(aminoanthraquinone), polyvinylanthraquinone, poly(1-aminoanthraquinone), and poly(3,7-dialkylbenzo[1,2-b:4,5-b']dithiophene-4,8-dione-2,6-diyl).

12. The tag apparatus of claim 1, wherein the redox-active polymer film comprises a cathode material selected from the group consisting of poly(1-naphthol) and poly(10-hexylphenothiazine-3,7-diyl).

13. The tag apparatus of claim 1, wherein the redox-active polymer film comprises an anode material selected from the group consisting of polyaniline, poly(aminoanthraquinone), polyvinylanthraquinone, poly(1-aminoanthraquinone), and poly(3,7-dialkylbenzo[1,2-b:4,5-b']dithiophene-4,8-dione-2,6-diyl), and a cathode material selected from the group consisting of poly(1-naphthol) and poly(10-hexylphenothiazine-3,7-diyl).

14. The tag apparatus of claim 1, wherein the tag apparatus comprises an area in a range including 0.1 $cm^2$ and 1 $cm^2$.

15. The tag apparatus of claim 1, wherein an electrical conductivity of the redox-active polymer film is configured to vary according to a plurality of values based on environmental conditions.

16. An active tag apparatus, comprising:
a conductive structure formed on a substrate comprising a first terminal and a second terminal configured to receive an electrical signal therebetween;
an electrochemical energy storage device comprising:
a first electrode layer comprising a first redox-active polymer having mobile ions and electrons, the first electrode layer having a first redox potential;
a second electrode layer comprising a second redox-active polymer having mobile ions and mobile electrons, the second electrode layer having a second redox potential higher than the first redox potential;
an electrolyte layer interposed between the first electrode layer and the second electrode layer, the electrolyte layer comprising a conductive polymer film configured to conduct ionic current by passing mobile ions therethrough between the first and second electrode layers, the conductive polymer film further configured to not conduct a substantial amount of electronic current;
an adhesive layer on the first electrode layer;
a protective layer comprising a non-conducting polymer on the second electrode layer that is arranged on an opposite side of the electrochemical energy storage device than the adhesive layer; and
a load device operatively coupled to the electrochemical energy storage device, wherein the bad device comprises an electroluminescent device that comprises at least one of the first redox-active polymer and the second redox-active polymer of the electrochemical energy storage device;

wherein under a charge condition, the electrochemical energy storage device is configured to be charged through an ionic current flowing through the electrolyte layer between the first and second electrode layers, wherein under a discharge condition, the first electrode layer is configured to be oxidized and the second electrode layer is configured to be reduced such that an electronic current flow s through the load device, wherein one or both of the first redox-active polymer and the second redox-active polymer integrally extend to form at least portions of the conductive structure and the load device; and wherein the bad device comprises a detection circuit bad device that is configured to detect a change in electrical conductivity of the conductive structure in response to a change in the temperature of the conductive structure of 1° C. or greater or a change in the relative humidity surrounding the conductive structure of 1 percent or greater.

17. The active tag apparatus of claim 16, wherein the difference between the second redox potential and the first redox potential exceeds about 0.5V.

18. The active tag apparatus of claim 16, wherein the first electrode layer serves as an anode of the electrochemical energy storage device, and wherein the first redox-active polymer comprises at least one polymer selected from the group consisting polyaniline, poly(aminoanthraquinone), polyvinylanthraquinone, poly(l-aminoanthraquinone) and poly(3,7-dialkylbenzol[1,2-b:4,5-b']dithiophene-4,8-dione-2,6-diyl).

19. The active tag apparatus of claim 17, wherein the second electrode layer serves as a cathode of the electrochemical energy storage device, and wherein the second redox-active polymer comprises a polymer selected from the group consisting of poly(1-naphthol) and poly(10-hexylphenothiazine-3,7-diyl).

20. The active tag apparatus of claim 16, wherein the load device is configured to transmit an electromagnetic signal or a light signal for a predetermined time period between about 10 seconds and 24 hours.

21. The active tag apparatus of claim 16, wherein the load device comprises an ID chip configured to transmit identification information.

22. The active tag apparatus of claim 16, wherein the tag apparatus is an active ID device having an antenna configured to receive and transmit an electromagnetic electrical signal using energy from the storage device, the active tag apparatus further comprising:

the conductive structure that comprises the antenna, the conductive structure comprising a third redox-active polymer having mobile ions and electrons and configured to conduct an electrical current generated by the mobile ions and the electrons in response to the electromagnetic electrical signal; and a conversion circuit configured to convert the electromagnetic electrical signal into a DC voltage, wherein the electrochemical energy storage device is configured to be charged in response to the DC voltage developed by mobile ions passing between the first and second electrode layers in response to the DC voltage.

23. The active tag apparatus of claim 22, wherein the third redox-active polymer of the conductive structure is the same redox-active polymer as one of the first or second redox-active polymers.

24. An active tag apparatus, comprising:

a conductive structure having a first terminal and a second terminal and configured to receive an electromagnetic signal therebetween;

a conversion circuit configured to convert the electromagnetic signal into a DC voltage;

an electrochemical energy storage device having a first electrode layer and a second electrode layer configured to receive the DC voltage, the storage device further comprising an electrolyte layer interposed between the first electrode layer and the second electrode layer, wherein the electrolyte layer comprises a conductive polymer film configured to pass mobile ions, the storage device further comprising an adhesive layer on the first electrode layer and a protective layer comprising a non-conducting polymer on the second electrode layer that is arranged on an opposite side of the electrochemical energy storage device than the adhesive layer; and a detection circuit load device that is configured to detect a change in electrical conductivity of the conductive structure in response to a change in the temperature of the conductive structure of 1° C. or greater or a change in the relative humidity surrounding the conductive structure of 1 percent or greater;

wherein the storage device is configured to be charged in response to the DC voltage developed by mobile ions passing between the first and second electrode layers in response to the DC voltage;

wherein one or both of the first electrode layer and the second electrode layer comprise a redox-active polymer film that integrally extends to form at least portions of the conductive structure and the conversion circuit; and wherein the first electrode layer comprises a first redox-active polymer and the second electrode layer comprises a second redox-active polymer and at least one of the first electrode layer or the second electrode layer comprises a protective compound adapted to protect at least one of the first redox-active polymer or the second redox-active polymer from over-charging or over-discharging, and the protective compound is selected from the group consisting of a phenothiazine, iodine, triiodine, benzoquinone, naphthoquinone, and anthraquinone.

25. The active tag apparatus of claim 24, wherein the first electrode layer serves as an anode of the electrochemical energy storage device, and wherein the first electrode layer comprises at least one polymer selected from the group consisting of polyaniline, poly(aminoanthraquinone), polyvinylanthraquinone, poly(l-aminoanthraquinone) and poly(3,7-dialkylbenzol[1,2-b:4,5-b']dithiophene-4,8-dione-2,6-diyl).

26. The active tag apparatus of claim 25, wherein the second electrode layer serves as a cathode of the electrochemical energy storage device, and wherein the second electrode layer comprises a polymer selected from the group consisting of poly(l-naphthol) and poly(10-hexylphenothiazine-3,7-diyl).

27. The active tag apparatus of claim 24, wherein the redox-active polymer film is formed from a same sheet of redox-active polymer film and is continuous.

28. The active tag apparatus of claim 24, wherein the active tag apparatus is an active RFID tag.

29. A method of identifying, comprising:
providing the tag apparatus of claim 1; and detecting a change in the physical environment of the conductive structure through detecting the electrical current flowing through the conductive structure.

30. A method of generating an identification signal, comprising:
providing the active tag apparatus of claim 16;
discharging the electrochemical energy storage device through the load device by oxidizing the first electrode layer and reducing the second electrode layer such that an electronic current flows through the load device; and
charging the electrochemical energy storage device by passing an ionic current flowing through the electrolyte layer between the first and second electrode layers.

31. A method of identifying, comprising:
providing the active tag apparatus of claim 24;
receiving an electromagnetic signal using the active tag apparatus;
converting the electromagnetic signal into a DC voltage using the conversion circuit; and
charging the storage device using the DC voltage developed by mobile ions passing between the first and second electrode layers of the storage device in response to the DC voltage generated by the conversion circuit.

32. A method of manufacturing a tag apparatus, comprising:
providing a conductive structure comprising a layer of redox-active polymer film having mobile ions and mobile electrons, the conductive structure further comprising a first terminal and a second terminal configured to receive an electrical signal therebetween, wherein the first terminal and the second terminal are provided at opposing ends of the conductive structure such that the conductive structure is continuous between the first terminal and the second terminal;
providing a detection circuit configured to conduct an electrical current generated by the mobile ions and the mobile electrons in response to the electrical signal, wherein the conductive structure and the detection circuit are integrally formed from a same sheet of redox-active polymer film, and wherein the detection circuit is further configured to detect and store identification information of the tag apparatus; and
operatively coupling the conductive structure and the detection circuit;
wherein the same sheet of redox-active polymer film is configured to conduct an electrical current generated by the mobile ions and the mobile electrons in response to the electrical signal; and
wherein the detection circuit is configured to detect a change in electrical conductivity of the redox-active polymer film in response to a change in the temperature of the conductive structure of 1° C. or greater or a change in the relative humidity surrounding the conductive structure of 1 percent or greater.

33. The method of claim 32, wherein providing the conductive structure comprises roll-to-roll processing of the same sheet of redox-active polymer film and die-cutting the same sheet of redox-active polymer film into the conductive structure.

34. The method of claim 33, wherein providing the detection circuit comprises providing at least one of a voltage detection circuit and a current detection circuit that is physically separated from a substrate.

35. The method of claim 33, wherein providing the detection circuit comprises providing at least a portion of the detection circuit by die-cutting the same sheet of redox-active polymer film in a die-cutting process.

36. A method of manufacturing an active tag apparatus, comprising:
providing a conductive structure formed on a substrate comprising a first terminal and a second terminal configured to receive an electrical signal therebetween;
providing an electrochemical energy storage device, the storage device comprising:
a first electrode layer comprising a first redox-active polymer having mobile ions and mobile electrons, the first electrode layer having a first redox potential;
a second electrode layer comprising a second redox-active polymer having mobile ions and mobile electrons, the second electrode layer having a second redox potential higher than the first redox potential;
an electrolyte layer interposed between the first electrode layer and the second electrode layer, the electrolyte layer comprising a conductive polymer film configured to conduct ionic current by passing mobile ions through the electrolyte layer between the first and second electrode layers, the conductive polymer film further configured to not conduct current electronically;
an adhesive layer on the first electrode layer; and
a protective layer comprising a non-conducting polymer on the second electrode layer that is arranged on an opposite side of the electrochemical energy storage device than the adhesive layer;
wherein under a charge condition, the storage device is configured to be charged through an ionic current flowing through the electrolyte layer between the first and second electrode layers;
providing a load device that comprises an electroluminescent device that comprises at least one of the first redox-active polymer and the second redox active polymer of the electrochemical energy storage device;
wherein one or both of the first redox-active polymer and the second redox-active polymer integrally extend to form at least portions of the conductive structure and the load device;
operatively coupling the load device to the storage device, wherein under a discharge condition, the first electrode layer is configured to be oxidized and the second electrode layer is configured to be reduced such that an electronic current flows through the load device; and
wherein the load device comprises a detection circuit load device that is configured to detect a change in electrical conductivity of the conductive structure in response to a change in the temperature of the conductive structure of 1° C. or greater or a change in the relative humidity surrounding the conductive structure of 1 percent or greater.

37. A method of manufacturing an active tag apparatus, comprising:
providing a conductive structure having a first terminal and a second terminal and configured to receive an electromagnetic signal therebetween;
providing a conversion circuit configured to convert the electromagnetic signal into a DC voltage;
providing an electrochemical energy storage device having a first electrode layer and a second electrode layer configured to receive the DC voltage, the storage device further comprising an electrolyte layer interposed between the first electrode layer and the second electrode layer, wherein the electrolyte layer comprises a conductive polymer film configured to pass mobile ions, the storage device further comprising an adhesive layer on the first electrode layer and a protective layer comprising a non-conducting polymer on the second electrode layer that is arranged on an opposite side of the electrochemical energy storage device than the adhesive layer;

providing a detection circuit load device that is configured to detect a change in electrical conductivity of the conductive structure in response to a change in the temperature of the conductive structure of 1° C. or greater or a change in the relative humidity surrounding the conductive structure of 1 percent or greater;

wherein one or both of the first electrode layer and the second electrode layer comprise a redox-active polymer film that integrally extends to form at least portions of the conductive structure and the conversion circuit, and at least one of the first electrode layer or the second electrode layer comprises a protective compound adapted to protect the redox-active polymer film from over-charging or over-discharging, and the protective compound is selected from the group consisting of a phenothiazine, iodine, tri-iodine, benzoquinone, naphthoquinone, and anthraquinone; and electrically connecting the conductive structure, the conversion circuit, and the storage device;

wherein the storage device is configured to be charged in response to the DC voltage developed by mobile ions passing between the first and second electrode layers in response to the DC voltage.

* * * * *

UNITED STATES PATENT AND TRADEMARK OFFICE
CERTIFICATE OF CORRECTION

PATENT NO. : 11,003,870 B2  
APPLICATION NO. : 14/442087  
DATED : May 11, 2021  
INVENTOR(S) : Cody Friesen and Elise Switzer Page 1 of 1

It is certified that error appears in the above-identified patent and that said Letters Patent is hereby corrected as shown below:

In the Claims

In Claim 16:
Column 18, Line 66, replace "wherein the bad device" with --wherein the load device--.
Column 19, Line 11, replace "electronic current flow s through the load device" with --electronic current flows through the load device--.
Column 19, Lines 16-17, replace "wherein the bad device comprises a detection circuit bad device" with --wherein the load device comprises a detection circuit load device--.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*